United States Patent
Zhao et al.

(10) Patent No.: US 9,906,346 B2
(45) Date of Patent: Feb. 27, 2018

(54) SYSTEM AND METHOD FOR INTELLIGENT CHANNEL STATE INFORMATION SELECTION

(71) Applicant: Futurewei Technologies, Inc., Plano, TX (US)

(72) Inventors: Renjian Zhao, Acton, MA (US); Zhengxiang Ma, Summit, NJ (US); Leonard Piazzi, Denville, NJ (US); Jian Wang, Bridgewater, NJ (US); Weimin Xiao, Hoffman Estates, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 75 days.

(21) Appl. No.: 14/946,624

(22) Filed: Nov. 19, 2015

(65) Prior Publication Data
US 2016/0149684 A1     May 26, 2016

Related U.S. Application Data (60) Provisional application No. 62/083,055, filed on Nov. 21, 2014.

(51) Int. Cl.
| | |
|---|---|
| *H04L 5/00* | (2006.01) |
| *H04B 7/0413* | (2017.01) |
| *H04B 7/06* | (2006.01) |
| *H04W 24/10* | (2009.01) |

(52) U.S. Cl.
CPC ......... *H04L 5/0053* (2013.01); *H04B 7/0413* (2013.01); *H04B 7/063* (2013.01); *H04B 7/0626* (2013.01); *H04W 24/10* (2013.01); *H04L 5/0023* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2010/0322102 A1* | 12/2010 | Zhou | H04L 1/0021 370/252 |
| 2012/0134275 A1 | 5/2012 | Choi et al. | |
| 2013/0303090 A1* | 11/2013 | Hammarwall | H04B 7/0456 455/67.13 |
| 2013/0322278 A1 | 12/2013 | Lee et al. | |
| 2014/0293815 A1* | 10/2014 | Xia | H04L 1/0026 370/252 |

FOREIGN PATENT DOCUMENTS

| | | |
|---|---|---|
| CN | 103929781 A | 7/2014 |
| WO | 2015158252 A1 | 10/2015 |

* cited by examiner

*Primary Examiner* — Hassan Kizou
*Assistant Examiner* — Ashil Farahmand
(74) *Attorney, Agent, or Firm* — Slater Matsil, LLP (57) ABSTRACT

A method for providing feedback information includes receiving a configuration of a plurality of offset values, determining the feedback information in accordance with at least one measurement made by a user equipment and with the plurality of offset values, and sending the feedback information to a network controller.

30 Claims, 11 Drawing Sheets

SYSTEM AND METHOD FOR INTELLIGENT CHANNEL STATE INFORMATION SELECTION

This application claims the benefit of U.S. Provisional Application No. 62/083,055, filed on Nov. 21, 2014, entitled "System and Method for Intelligent RI/PMI Selection," which application is hereby incorporated herein by reference.

TECHNICAL FIELD

The present disclosure relates generally to digital communications, and more particularly to a system and method for intelligent channel state information (CSI) selection.

BACKGROUND

In the Third Generation Partnership (3GPP) Long Term Evolution (LTE) downlink multiple-input multiple-output (MIMO) transmission modes, user equipments (UEs) in the communications system feedback their best channel state information (CSI), such as rank indicator (RI) and/or precoding matrix indicator (PMI), to evolved NodeBs (eNBs), according to the criterion of maximizing the UEs' own throughput. However, determining maximum throughput at every UE individually is generally not the same as maximizing overall system throughput, since different CSI values will generate different levels and types of interference to other UEs in the system. This is particularly true when MIMO vertical tilting (different down tilt beam angles) is used because a higher down tilt beam will generally cause less interference to other devices.

SUMMARY OF THE DISCLOSURE

Example embodiments provide a system and method for intelligent channel state information (CSI) selection.

In accordance with an example embodiment, a method for providing feedback information is provided. The method includes receiving, by a user equipment (UE), a configuration of a plurality of offset values, determining, by the UE, the feedback information in accordance with at least one measurement made by the UE and with the plurality of offset values, and sending, by the UE, the feedback information to a network controller.

In accordance with another example embodiment, a method for receiving feedback information is provided. The method includes signaling, by a network controller, a configuration of a plurality of offset values, the configuration prompting a selection of the feedback information in accordance with at least one measurement and with the plurality of offset values, and receiving, by the network controller, the feedback information.

In accordance with another example embodiment, a user equipment (UE) adapted to provide feedback information is provided. The UE includes a processor, and a computer readable storage medium storing programming for execution by the processor. The programming including instructions that when executed by the processor configures the UE to receive a configuration of a plurality of offset values, to determine the feedback information in accordance with at least one measurement made by the UE and with the plurality of offset values, and to send the selected feedback information to a network controller.

Practice of the foregoing embodiments enables improved communications system capacity by considering the interference impact of selected CSI values on other devices.

Moreover, practice of the foregoing embodiments enables the use of artificially generated interference impact values in place of actual measured interference impact values to simplify implementation.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to intelligent selection of channel state information (CSI). For example, a UE receives a configuration of a plurality of offset values, determines the feedback information in accordance with at least one measurement made by the UE and the plurality of offset values, and sends the feedback information to a network controller.

The embodiments will be described with respect to example embodiments in a specific context, namely communications systems that use CSI feedback by UE to improve communications performance. The embodiments may be applied to standards compliant communications systems, such as those that are compliant with Third Generation Partnership Project (3GPP), IEEE 802.11, and the like, technical standards, and non-standards compliant communications systems that likewise use CSI feedback by UE to improve communications performance.

Figure 1:
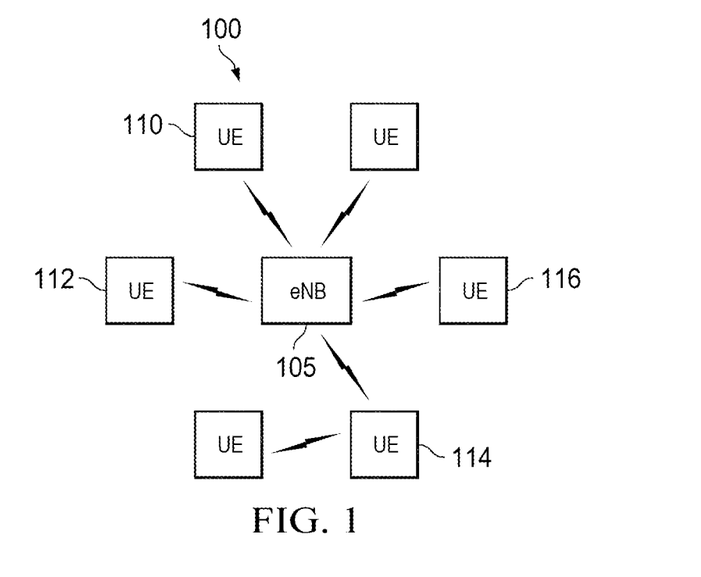
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UEs 110, 112, 114, and 116. The eNB 105 allocates communications resources for transmissions over a downlink to a UE and transmissions over an uplink from a UE. Communications system 100 includes a network controller, which may be an eNB, a communications controller, or a higher level entity in the communications system that provides communications support.

While it is understood that communications systems may employ multiple eNBs capable of communicating with a number of UEs, only one eNB, and a number of UEs are illustrated for simplicity.

In the downlink multiple input multiple output (MIMO) transmissions modes as specified in the Third Generation Partnership Project (3GPP) Long Term Evolution (LTE) technical standards, each UE is to select (and then feedback) the best CSI values (e.g., rank indications (RI) and/or precoding matrix indicators (PMI)) that maximizes its own throughput.

Figure 2:
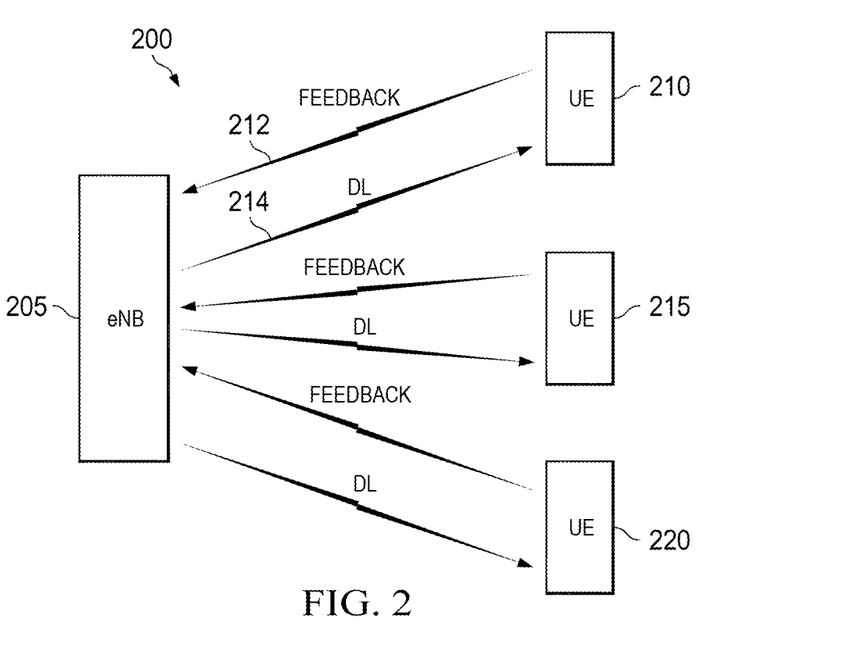
FIG. 2 illustrates an example communications system highlighting the role of CSI feedback in downlink MIMO transmissions according to example embodiments described herein.

FIG. 2 illustrates an example communications system 200 highlighting the role of CSI feedback in downlink MIMO transmissions. Communications system 200 includes an eNB 205 serving a plurality of UEs, such as UEs 210, 215, and 220. As discussed previously, the UEs are to select (and then feedback) the best CSI values that maximize their own throughput. As shown in FIG. 2, UE 210 selects and then feeds back CSI values on channel 212. The feedback CSI values have an impact on a downlink transmission on channel 214. Other UEs may also select (and then feedback) the CSI values that best maximize their own respective throughput. However, the CSI values for different UEs may differ depending on their own channel conditions.

However, maximizing the individual throughput of each UE is usually not equivalent to maximizing overall communications system throughput. This is because different CSI values will generally cause different amounts of interference to other devices in the communications system. Typically, different CSI values will result in the selection of different transmission parameters by the eNB serving the UE, which may cause different amounts and/or types of interference. The difference in interference to other devices is particularly noticeable when MIMO vertical tilting is used, since higher down tilt beams will typically generate less interference to other devices.

Figure 3:
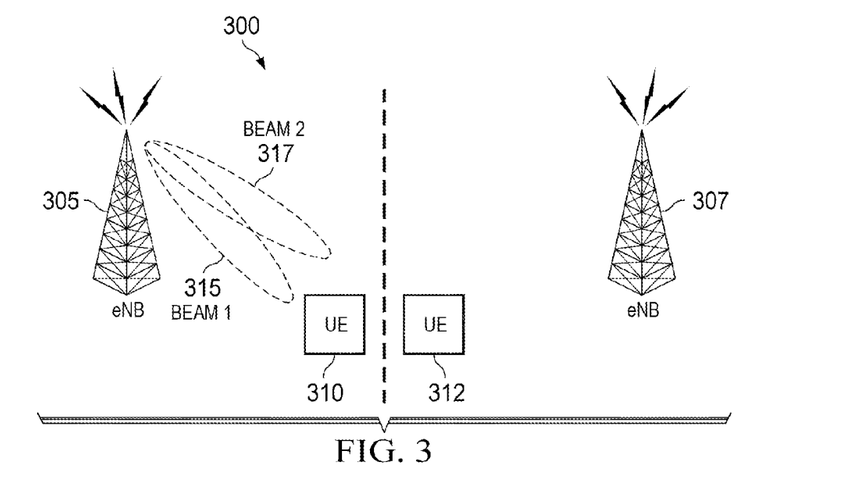
FIG. 3 illustrates an example communications system highlighting the effects of down tilt beams on interference according to example embodiments described herein.

FIG. 3 illustrates an example communications system 300 highlighting the effects of down tilt beams on interference. Communications system 300 includes a first eNB 305 and a second eNB 307. First eNB 305 is serving a first UE 310, while second eNB 307 is serving a second UE 312. Both first UE 310 and second UE 312 are located near the edge of the coverage area of their respective serving eNBs. As shown in FIG. 3, first eNB 305 is capable of transmitting to first UE 310 using one of two transmission beams (beam 1 315 and beam 2 317). Beam 1 315 has a higher down tilt angle than beam 2 317. Beam 1 315 is pointed more directly at first UE 310 while beam 2 317 is point more directly at second UE 312. Therefore, transmissions to first UE 310 using beam 1 315 will likely generate less interference at second UE 312 than transmissions using beam 2 317.

According to an example embodiment, a UE selects CSI values in consideration with its own throughput and with the interference caused to other devices. In other words, the UE considers self-optimization (its own throughput) as well as system or network optimization (interference caused to other devices) when it selects the CSI values. According to an example embodiment, a UE selects CSI values to maximize its own throughput and to maximize overall communications system capacity (or equivalently, minimize interference caused to other devices). However, the UEs do not require transmission beam coordination, which entails complicated algorithms. Beam coordination also requires real-time message exchange among the eNBs, which increases communications overhead and communications system complexity.

According to an example embodiment, beam coordination is considered in a statistical sense, so real-time message exchange is not needed. Instead, UEs use interference information that represents statistical interference caused to the communications system as a whole for different CSI values. In other words, when a UE selects CSI values to feed back to its serving eNB, the UE not only considers its own benefit (self-optimization), but it also considers the interference it will cause to other devices using the interference information (system or network optimization).

As an illustrative example, the throughput information related to particular CSI value selection is presented in tabular form (hereby referred to herein as a blue table (BT)) in which each information element represents a throughput value associated with a particular CSI value. The throughput information may be presented in the form of numerical values with units of bits/Hz/second. The numerical values may be referred to as mutual information (MI). The throughput information may be derived from signal plus interference to noise ratio measurements.

As an illustrative example, the interference information is presented in tabular form (hereby referred to herein as a green table (GT)) in which each information element represents the interference that a particular CSI value causes to the communications system. The interference information in the green table may be represented in the form of numerical values representing offsets (or equivalent differences or deltas) relative to corresponding values in the blue table. The interference information may also be in units of bits/Hz/second. Example interference information values are presented graphically in FIGS. 7A and 7B.

When making the CSI value selection, the UE takes into consideration the blue table and the green table, which captures the throughtput of the UE and the interference that the UE will cause to other devices in a statistical sense. Because the interference is considered in a statistical sense, no real-time message exchange is needed.

Referring back to FIG. 3, when first UE 310 is selecting CSI values to feedback to first eNB 305, it may make use of a decision criterion that combines throughput information from a BT and interference information from a GT for each of the two transmission beams from first eNB 305. As an example, the design criterion adds the throughput information and the interference information for beam 1 315 for given CSI values (i.e., throughput information (beam 1 315, CSI values) plus interference information (beam 1 315, CSI values)) and for beam 2 317 for given CSI values (i.e., throughput information (beam 2 317, CSI values) plus interference information (beam 2 317, CSI values)) and first UE 310 selects the larger of the two values along with the associated CSI values. First UE 310 sends the CSI values to first eNB 305.

Figure 4A:
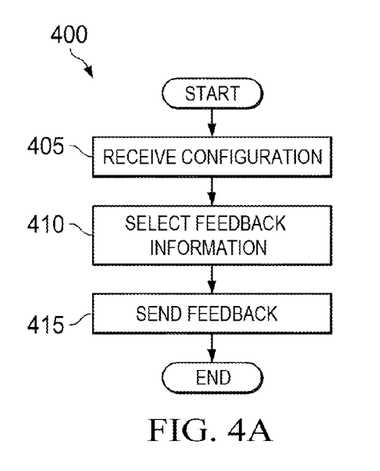
FIG. 4A illustrates a flow diagram of example operations occurring in a UE as the UE selects CSI values to feedback to an eNB according to example embodiments described herein.

FIG. 4A illustrates a flow diagram of example operations 400 occurring in a UE as the UE selects CSI values to feedback to an eNB. Operations 400 may be indicative of operations occurring in a UE as the UE selects CSI values while considering both self-optimization and system or network optimization.

Operations 400 begin with the UE receiving configuration information (block 405). The configuration information may specify an arrangement of a GT and/or a BT. The configuration information may specify throughput values for the BT, as well as interference offset values for the GT. The throughput values and the interference offset values can be used to generate the BT and GT tables, change the values in the GT and BT tables, and/or change values read out of the GT and BT tables. The throughput values may be numerical values representing UE throughput with units of bits/Hz/second or bps/Hz, and may be associated with different CSI values. The throughput values indicate the throughput of the UE if the UE selects one of the associated CSI values and reports the selected CSI value to the BS. The interference offset values are general numerical values with units of bits/Hz/second, and are associated with different CSI values. The interference offset values indicate a change in interference level caused by transmissions to the UE if the UE selects one of the associated CSI values and reports the selected CSI value to the BS.

The configuration information may specify the reporting of the feedback information. Signaling from a network entity device, such as an eNB, a communications controller, and the like, may be used to configure the reporting of the feedback information by the UE. A detailed discussion of example configuration signaling is provided below. The UE selects feedback information (block 410). The feedback information selected by the UE may include CSI values, such as RI and/or PMI. The feedback information may also include beam selection information, reference signal (such as channel state information reference signal (CSI-RS)) resource selection, and so on. The feedback information is selected in accordance with a decision criterion that optimizes the UE individually (i.e., self-optimization), as well as optimizing the network or system (i.e., system or network optimization). As an illustrative example, the decision criterion combines, such as sums, throughput information (individual information stored in a BT, for example) with interference information (system wide information stored in a GT, for example) for different CSI values and selects the combination/summation with the largest value. The throughput information may be derived from measurements made by the UE. As an illustrative example, the UE measures channel quality, signal to noise ratio, signal plus interference to noise ratio, and the like, and derives the throughput information from the measurements. The interference information may be provided by the offset values received by the UE. The UE sends the selected feedback information (block 415).

Figure 4B:
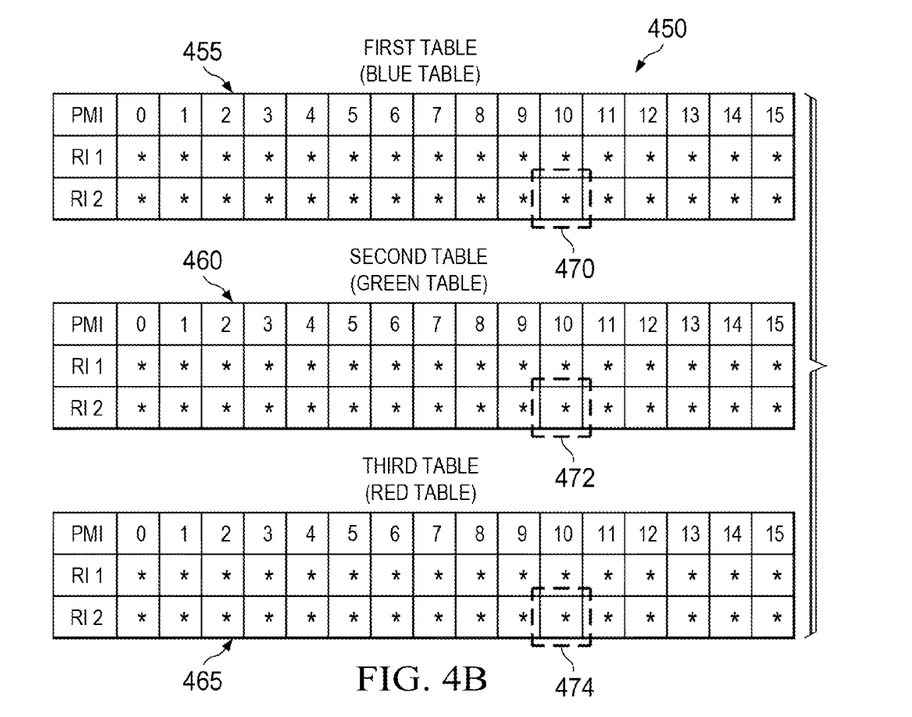
FIG. 4B illustrates an example tabular arrangement of information used in the selection of CSI values according to example embodiments described herein.

FIG. 4B illustrates an example tabular arrangement 450 of information used in the selection of CSI values. As shown in FIG. 4B, the information used in the selection of CSI values is arranged into three tables. A first table 455 comprises individual information, such as throughput information, and is referred to as a BT or blue table. A second table 460 comprises system wide information, such as interference information, and is referred to as a GT or green table. A third table 465 comprises a combination of the individual information and the system wide information, where the combination of the individual information and the system wide information is in accordance with a selection criterion. An example selection criterion sums the individual information to the system wide information. Other selection criteria may combine the individual information and the system wide information in different ways, such as a weighted sum, an average, a difference, and so on. Third table 465 may be referred to as a red table.

Each table is indexed by CSI values, for example, RI and PMI, as shown in FIG. 4B. As an example, table entry 470 of first table 455 corresponds to a PMI of 10 and a RI of 2 and contains a throughput value for a UE if the associated CSI values are reported to the UE's serving eNB. Table entry 472 of second table 460 corresponds to a PMI of 10 and a RI of 2 (just as table entry 470 of first table 455) and contains an offset value for the throughput value contained in table entry 470 of first table 455 if the selects a PMI of 10 and a RI of 2 as the CSI values and reports the CSI values back to the serving eNB. Table entry 474 of third table 465 corresponds to a PMI of 10 and a RI of 2 (just as table entry 470 of first table 455 and table entry 472 of second table 460) and contains a combination (e.g., a summation, a weighted sum, and so on) of the throughput value of table entry 470 and the offset value of table entry 472.

Figure 5A:
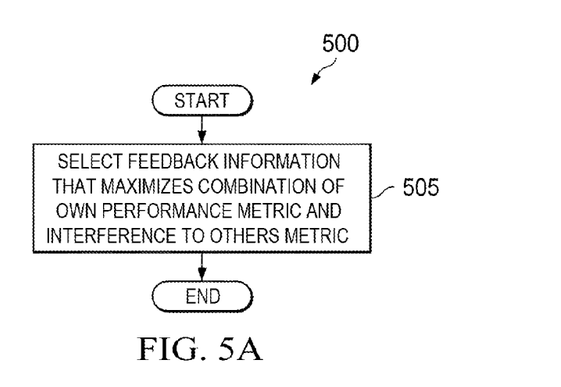
FIG. 5A illustrates a flow diagram of first example operation occurring in a UE selecting feedback information according to example embodiments described herein.

FIG. 5A illustrates a flow diagram of first example operation 500 occurring in a UE selecting feedback information. Operation 500 may be indicative of operations occurring in a UE as the UE selects feedback information. Operation 500 may be an implementation of block 410 of FIG. 4A.

Operation 500 begins with the UE selecting feedback information that maximizes a combination of its own performance metric and an interference to others metric (block 505).

Figure 5B:
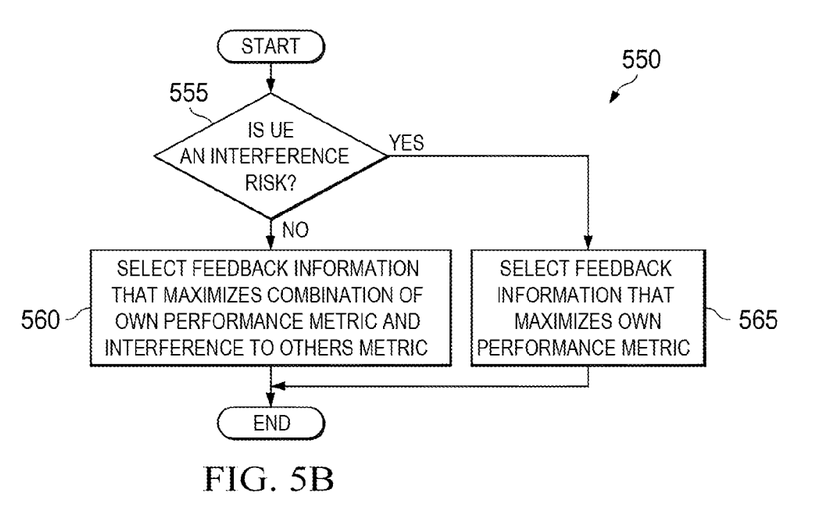
FIG. 5B illustrates a flow diagram of second example operations occurring in a UE selecting feedback information according to example embodiments described herein.

FIG. 5B illustrates a flow diagram of second example operations 550 occurring in a UE selecting feedback information. Operations 550 may be indicative of operations occurring in a UE as the UE selects feedback information. Operations 550 may be an implementation of block 410 of FIG. 4A.

In some situations, a UE may suffer a significant performance reduction if it considers system or network-wide optimization while selecting the feedback information. As an illustrative example, if a particular UE is located at an edge of a coverage area of a serving eNB (i.e., the particular UE is a cell edge UE), a transmission to the particular UE is likely to cause significant interference to another UE served by a different eNB. Therefore, if the particular UE considers interference to other devices while selecting its feedback information, the particular UE may select feedback information (e.g., CSI values) that will result in poor performance for itself. In such a situation, the particular UE may elect to protect itself and not consider system or network-wide optimization while selecting the feedback information.

Operations 550 begin with the UE performing a check to determine if it is an interference risk UE (block 555). As an illustrative example, the UE checks to determine if it is a cell edge UE. If the UE is not an interference risk UE, the UE selects feedback information that maximizes a combination of its own performance metric and an interference to others metric (block 560). In other words, the UE considers both self-optimization and system or network optimization if the UE is not an interference risk UE. However, if the UE is an interference risk UE, the UE selects feedback information that maximizes its own performance metric (block 565). In other words, the UE that is an interference risk UE may only consider self-optimization in selecting the feedback information. A reason that a UE that is an interference risk UE may only consider self-optimization in selecting the feedback information is that the UE is already operating in a poor environment, e.g., a low signal to noise ratio channel, and the UE should not sacrifice its performance to benefit other UEs. Additionally, since transmissions to the UE may have an exaggerated effect on other UEs, the consideration of system or network optimization may lead the UE to select feedback information that downgrades the channel between the eNB and the UE to the point that communications fails to meet performance requirements or becomes unreliable. On the other hand, a UE that is not an interference risk UE is operating in a good environment and can sacrifice some of its performance to benefit other UEs.

According to an example embodiment, the information (i.e., throughput information and/or interference information) in a blue table and a green table is developed using measurements of a communications system. According to another example embodiment, the information in a blue table and a green table is developed using simulation techniques. According to yet another example embodiment, the information in a blue table and a green table is developed using both measurements of a communications and simulation techniques.

Figure 6:
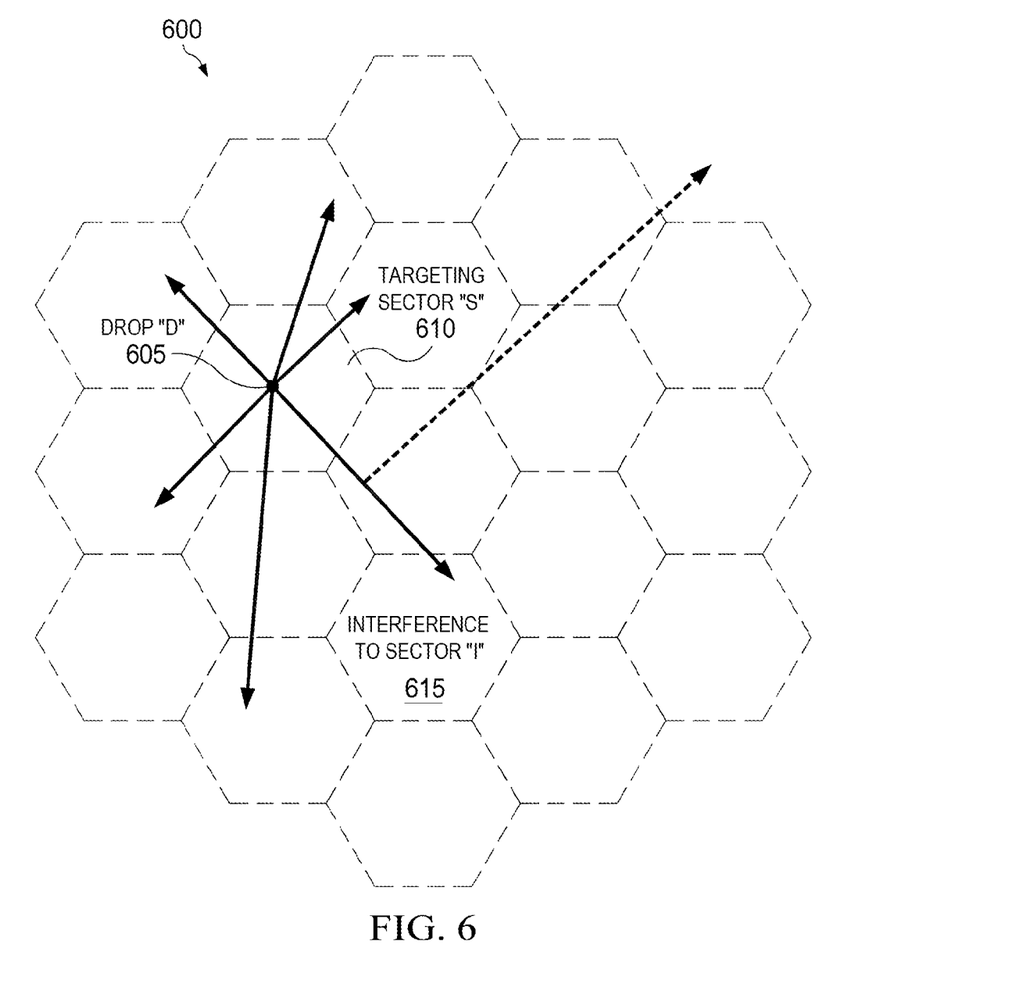
FIG. 6 illustrates an example model of a sectorized communications system used in development of interference information in a green table by simulation according to example embodiments described herein.

FIG. 6 illustrates an example model 600 of a sectorized communications system used in development of interference information in a green table by simulation. A value is represented as $MI_{d,s,i}(r, p)$, which is at drop "d" 605, for targeting sector "s" 610, for RI/PMI pair (rank indicator "r", PMI "p"). Mutual information achieved at sector "i" 615 includes interference effect. An embodiment procedure is as follows:
 average over all drops (to obtain statistical values);
 average over all targeting sectors (to obtain statistical values);
 sum over interference effect to all other sectors, i.e., sum over the rest of the overall network, e.g., 57−1=56 sectors,
 obtain a table of size (# of ranks, # of PMIs), where each entry is mutual information (MI) interference effect of the pair (rank indicator "r", PMI "p"), which is called a green table for convenience.

the entries in the green table are relative values, because selecting one pair versus another is a relative choice. Thus the mean is taken out to reflect the interference differences between pairs.

Figure 7A:
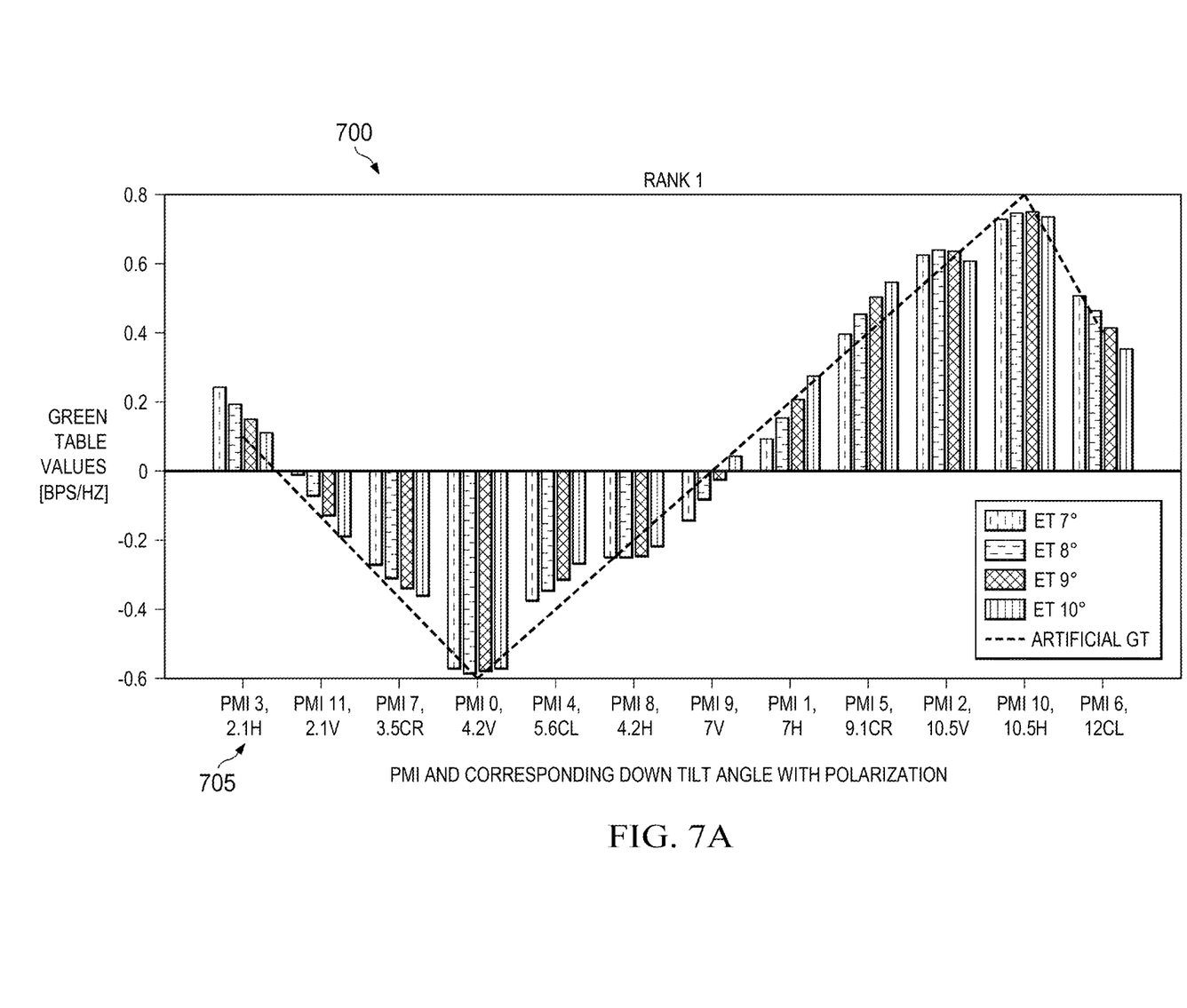
FIG. 7A illustrates a data plot of example green table values for PMI configurations corresponding to rank 1 according to example embodiments described herein.

FIG. 7A illustrates a data plot 700 of example green table values for different PMI configurations corresponding to rank 1. The Y-axis of data plot 700 displays the green table values in bits/Hz/second (or bps/Hz), and for the particular example shown in FIG. 7A, may range from about −0.6 to about +0.7 bits/Hz/second. The X-axis of data plot 700 displays different PMI configurations with corresponding down tilt angles and polarization. As an example, a first PMI value 705 corresponds to precoding matrix 3 (PMI 3) with a 2.1 degree down tilt angle and horizontal (H) polarization. Other polarizations include vertical (V), circular right (CR), and circular left (CL). Data plot 700 displays green table values for different electrical down tilt (ET) degrees ranging from 7 to 10 degrees. Also shown are green table values for an artificially generated green table. As shown in FIG. 7A, the interference caused to other devices will change relatively steadily for different PMI values, and the most vertical down tilt angle typically causes the least interference to other devices. Furthermore, artificially generated green table values can closely match measured (collected) green table values.

With respect to an artificially generated green table, the values in the artificially generated green table are collected using statistical simulation techniques, by averaging over drops and/or sectors, for example, as they are approximate values by nature. The simulations show that gains are relatively insensitive to small changes of measured green table values. Therefore, an artificially generated green table may be used in place of a measured green table, thereby simplifying implementation.

Figure 7B:
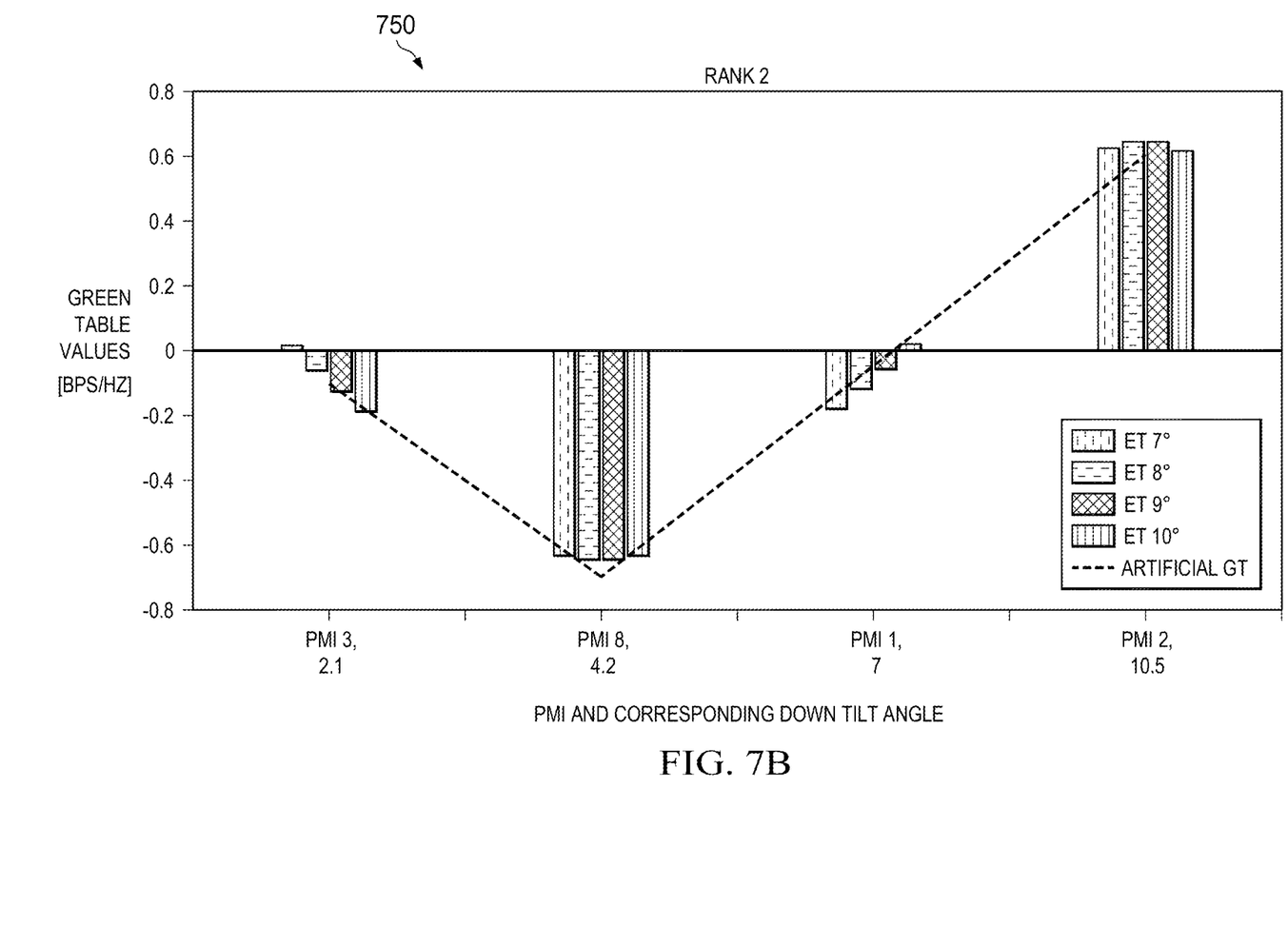
FIG. 7B illustrates a data plot of example green table values for PMI configurations corresponding to rank 2 according to example embodiments described herein.

FIG. 7B illustrates a data plot 750 of example green table values for different PMI configurations corresponding to rank 2. In the example shown in FIG. 7B, the offset values (the green table values) may range from about −0.6 to about +0.6 bits/Hz/second. Data plot 750 displays green table values for different ET degrees ranging from 7 to 10 degrees and for an artificially generated green table. Although there are fewer PMI values corresponding to rank 2, the interference behavior shown in FIG. 7B is similar to the interference behavior shown in FIG. 7A.

Therefore, green tables may be implemented using approximate values and an artificially generated green table may be used. In an actual implementation, rather than measuring (collecting) green table values statistically, simulation techniques may be used. The simulation technique uses long-term averaging and information exchanges between eNBs.

Figure 8A:
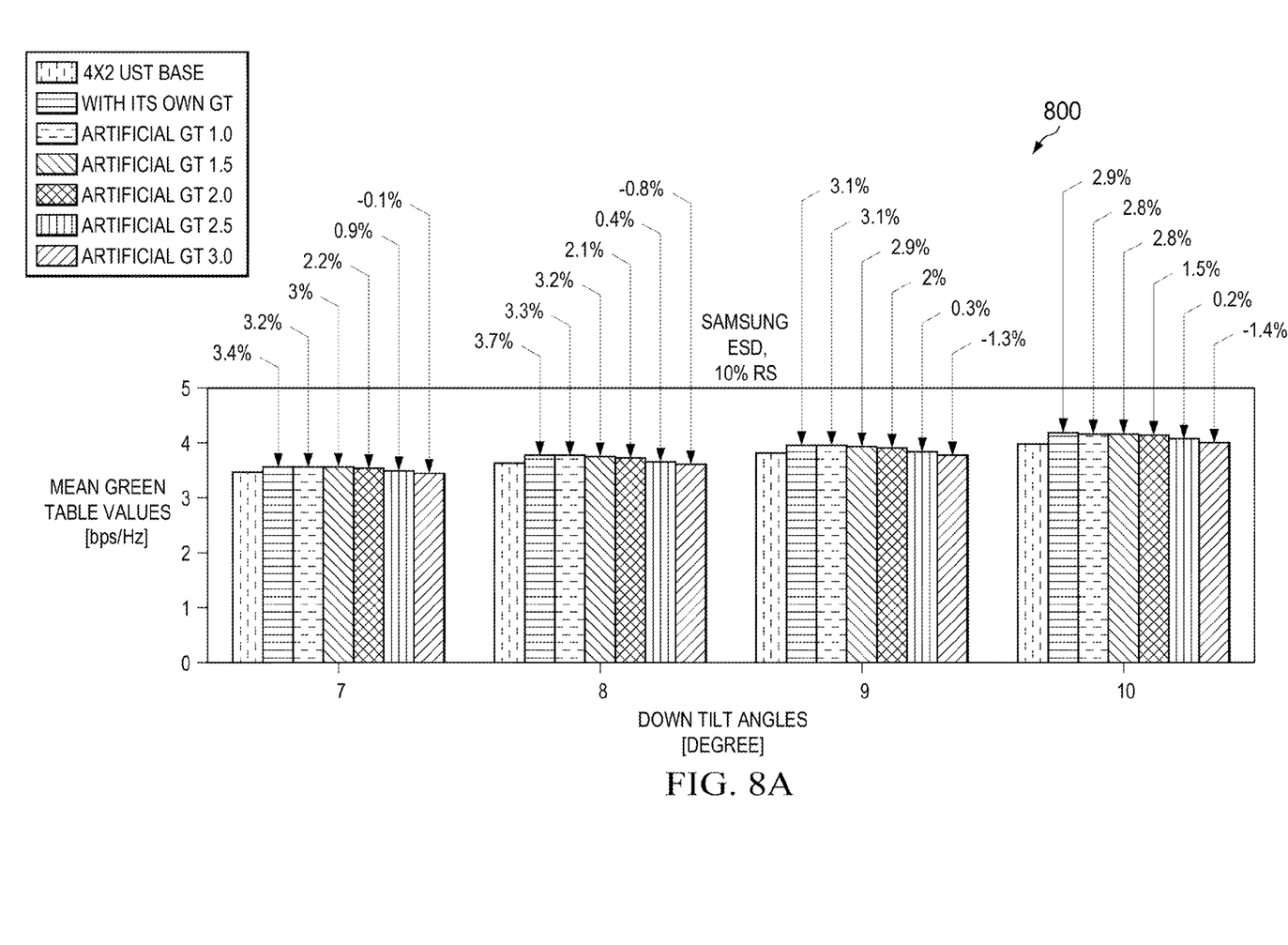
FIGS. 8A and 8B illustrate data plots of example mean and fifth percentile mutual information (MI), which is a measure of bits/Hz/second (or bps/Hz) for different tilt angles in degrees according to example embodiments described herein.
Figure 8B:
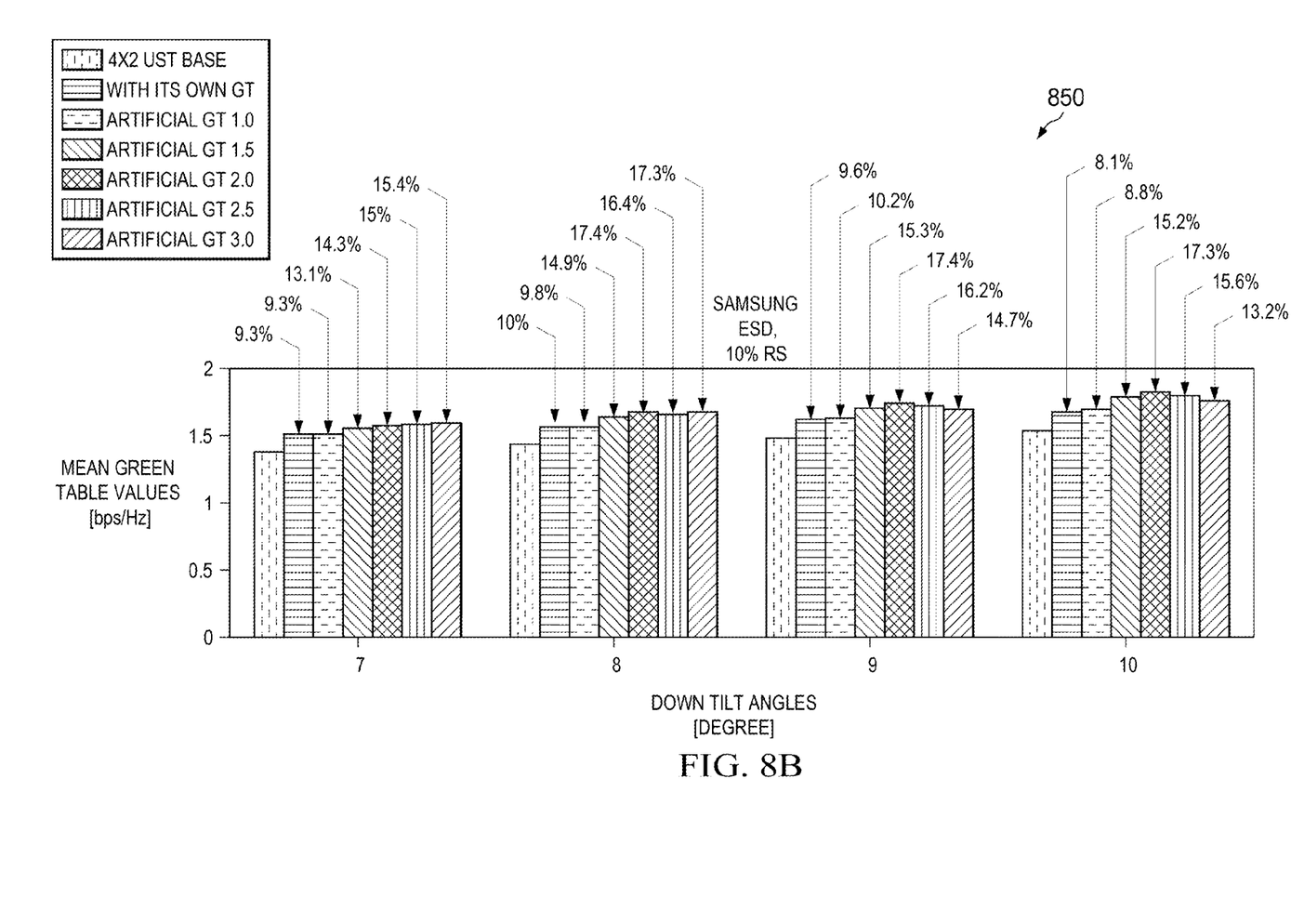

FIGS. 8A and 8B illustrate data plots 800 and 850 of example mean and fifth percentile mutual information (MI), which is a measure of bits/Hz/second (or bps/Hz) for different tilt angles in degrees, highlighting percentage differences in performance impact between using measured green table values and a variety of artificially generated green table values. The Y-axis of FIG. 8A corresponds to mean green table values for UEs in a communications system. The Y-axis of FIG. 8B corresponds to mean green table values averaged over the fifth percentile of UEs in the communications system. The X-axis of FIGS. 8A and 8B correspond to different antenna down tilt angles. While the antennas may typically be electronically tilted, it is also possible to mechanically tilt the antennas. In one example (depicted in FIG. 8A), an average green table value for transmissions with a down tilt angle of 7 degrees is about 3.5 bps/Hz when a measured green table is used. If a first artificially generated green table (ARTIFICIAL GT 1.0) is used, the averaged green table value for transmissions with an antenna tilt of 7 degrees is about 3.4% higher than when the measured green table is used. Similarly, an average green table value for transmissions with a down tilt angle of 8 degrees is slightly higher than the average green table value for transmissions with a down tilt angle of 7 degrees. As shown in FIG. 8A, percentage differences between the mean values of the measured green table values and the variety of artificially generated green table values are relatively small (generally less than 3 to 4 percent). However, as shown in FIG. 8B, for the fifth percentile MI values (which are indicative of cell edge devices or devices that are interference risks) by using the measured green table values and the variety of artificially generated green table values, the percentage differences can range from 8 to 17 percent. This behavior illustrates that the consideration of the system or network-wide optimization in the selection of the feedback information for non-interference risk devices can yield significant performance improvements, especially for the interference risk devices which are generally more susceptible to interference.

Figure 9A:
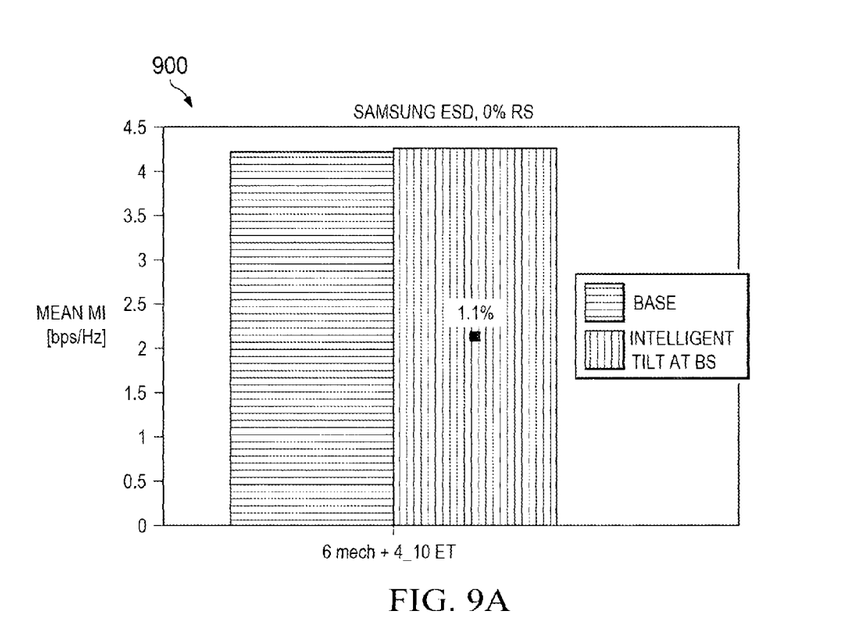
FIGS. 9A and 9B illustrate data plots of example mean and fifth percentile MI highlighting effectiveness of eNB mimicking the effect of the green table according to example embodiments described herein.
Figure 9B:
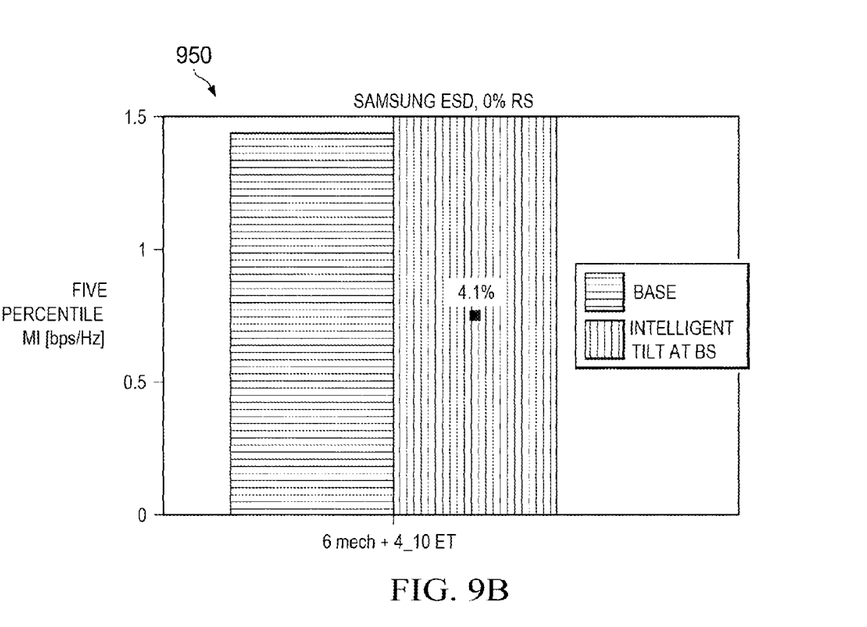

According to an example embodiment, an eNB attempts to mimic how a UE uses a green table. The eNB may access the green table but generally does not have access to a blue table (which is located at the UE). However, the eNB may apply rules that alter the feedback information reported by the UEs, to reduce interference among UE by mimicking the effect of the green table, for example. FIGS. 9A and 9B illustrate data plots 900 and 950 of example mean and fifth percentile MI highlighting effectiveness of eNB mimicking the effect of the green table. Once again, the data plots show that greater performance gains are realizable for cell edge devices, which are more prone to interference.

Figure 10:
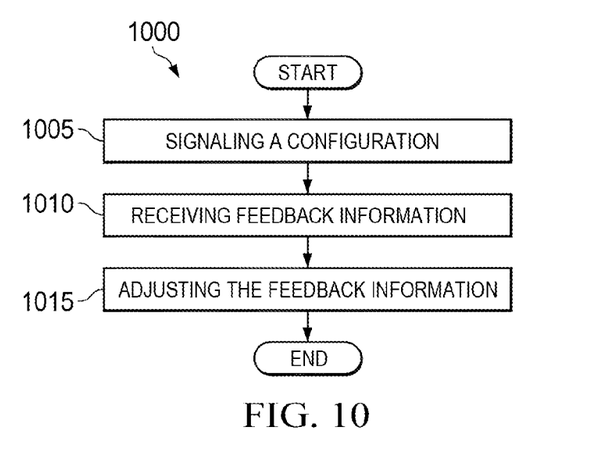
FIG. 10 illustrates a flow diagram of example operations occurring in an eNB according to example embodiments described herein.

FIG. 10 illustrates a flow diagram of example operations 1000 occurring in an eNB. Operations 1000 may be indicative of operations occurring in an eNB as the eNB receives and processes feedback information from a UE.

Operations 1000 begin with the eNB signaling a configuration for reporting feedback information to a UE (block 1005). The configuration may specify how the UE is to select the feedback information, and where, as well as when, to report the feedback information. The signaling may be performed using radio resource control (RRC) messaging or in system information blocks (SIB). The eNB receives feedback information (block 1010). The eNB adjusts the feedback information (block 1015). The eNB may adjust the feedback information to mimic the effects of the green table, for example. A discussion of the eNB adjusting the feedback information is provided below.

According to an example embodiment, communications system capacity is increased, especially for MIMO vertical tilt deployments. Example implementations may be realized in closed-loop MIMO based wireless communications systems and devices, such as UEs, eNBs, and the like.

According to an example embodiment, the use of a green table entails high-level communications and information exchanges between eNBs and UEs. According to another example embodiment, a UE uses a green table without communicating with other devices. According to yet another example embodiment, a UE uses a green table when making a decision regarding which feedback information to select and feedback. Typically, simulations show a 10 to 20 percent mean improvement or change in throughput gain for a cell edge UE for a variety of scenarios when compared to prior art techniques that do not consider system or network-wide optimization.

In some embodiments, feedback information from a UE includes RI, PMI, and/or a channel quality indicator (CQI). A network side entity (e.g., an eNB, a communications controller) may send additional signaling to a UE to modify the selection of feedback information by the UE or a feedback configuration over a wireless link. In some embodiments, a network side entity instructs a UE to report different types of feedback parameters. For example, a UE that is reporting CQI feedback information during an earlier period may receive an instruction from a network side entity to report PMI feedback information in addition to the CQI feedback during a subsequent period. This may allow the network side device to implement a transmission mode (e.g., multi-user (MU) MIMO) that requires PMI feedback (e.g., during the subsequent period. The network side device may also instruct the UE to report fewer feedback parameters to reduce overhead, or to report additional feedback parameters to improve link adaptation. In another embodiment, a network side entity instructs a UE to change the manner in which report feedback parameters are reported. For example, a network side entity may instruct a UE to reduce a frequency with which feedback information is reported to reduce overhead or increase a frequency with which feedback information is reported to improve link adaptation. As another example, the network side entity may instruct a UE report feedback parameters over a different channel or signaling layer, e.g., to report feedback information via higher layer signaling instead of a physical uplink control channel (PUCCH), etc. As yet another example, the network side entity may instruct a UE to report a different type of feedback information, e.g., stop reporting a RI and PMI pair and instead start reporting beam selection information and/or a reference signal resource selection, or to report beam selection information and/or a reference signal resource selection along with a RI and PMI pair. Changing the type of feedback information reported by a UE, or the manner in which feedback information is reported by the UE, during a subsequent period may be generally classified as a change in UE behavior, and may be triggered based upon feedback information reported by the UE during an earlier period. For example, a network side entity may instruct a UE to increase the frequency in which feedback information is communicated by a UE during a subsequent period upon receiving feedback information that indicates unstable and/or rapidly changing channel conditions during an earlier period.

In some embodiments, a UE may modify the selection of feedback information by the UE or a feedback configuration on its own. In some embodiments, the UE modifies the selection of the feedback information or the feedback configuration based on a measurement of operating condition, such as signal to noise ratio, signal plus interference to noise ratio, an error rate (such as a frame error rate, a packet error rate, a bit error rate, and so on), and the like. In other embodiments, the UE modifies the selection of the feedback information or the feedback configuration to trigger a change in transmission mode. As an example, by provided more information than a RI and PMI pair, the UE may provide sufficient information for the network side entity to use a more advantageous transmission mode, such as MU MIMO, CoMP, etc. Similarly, upon detection of decreased operating conditions, the UE may reduce the amount and/or frequency of feedback information to trigger the network side entity to use a more conservative transmission mode, such as switching from MU MIMO to single user (SU) MIMO.

According to an example embodiment, signaling from a network-side entity to the UE to facilitate changes in UE behavior is provided. A table of offset values (e.g., in bits/Hz/second, dB or CQI level) with an entry for each feedback information combination may be signaled in a RRC message. RRC signaling (i.e., the RRC message) may be cell specific (such as in a SIB) or UE specific (such as in a dedicated RRC message). In a situation where multiple CSI processes and subframe subsets are configured, separate configurations (with different values) may be configured for each. The separate configurations facilitate potential interference coordination. In a situation with multiple CSI processes, the separate configurations may also apply to interference coordination and coordinated multipoint (CoMP) operation. In a situation with carrier aggregation, an independent table may be configured for each carrier.

In accordance with an example embodiment, UE feedback information selection and reporting behavior is provided. In the presently available 3GPP LTE technical specifications, the UE feedback information selection technique is not mandated. Instead, proper performance requirements are defined. Hence, a UE may take into consideration the configured offset values when selecting the feedback information. Exact implementation may depend on whether the offset value is in bits/Hz/second, dB or CQI level, as well as whether the offset is per codeword and/or layer. The UE may report CQI(s), along with the selected feedback information without adding the offset(s). Performance requirements may be defined to ensure that the table of offset values is used at the UE when the table of offset values is configured. In a situation when time division duplexing (TDD) is used, the UE may be configured to report CQI without the feedback information. Therefore, this technique may be implemented at a network-side entity using an uplink sounding signal.

In accordance with an example embodiment, measurements from a UE to enable a network-side entity to determine the content of the signaling are specified. The offset values of the offset table may vary with the environment of the deployment of the eNBs or transmission points, especially in a situation of three-dimensional (3D) MIMO and in an area with high-rise buildings. A pre-deployment or initial-deployment driving test may be time consuming and costly. A general (and fixed) table may not provide good performance. The UE may feedback certain measurements (as in the case of MDT) that may be used for a network-side entity to determine the table of offset values. Measurement by the UE of the amplitude and phase of reference signals transmitted by neighboring eNBs may be used to derive the table of offset values. The UE may report all (or a number of the strongest) neighboring eNB channel measurements. The reports may not have to be often, once a minute or trigger-based, for example. When aggregated over a period of time and many UEs, the reports by the UEs may help a network-side device to determine a set of offset values. If both reference signal amplitude and phase information are estimated at the UE, then the UE reports may be based on measurements of pre-coded or beamformed transmissions. The content of the UE reports for neighboring eNBs may include relative interference levels.

Figure 11:
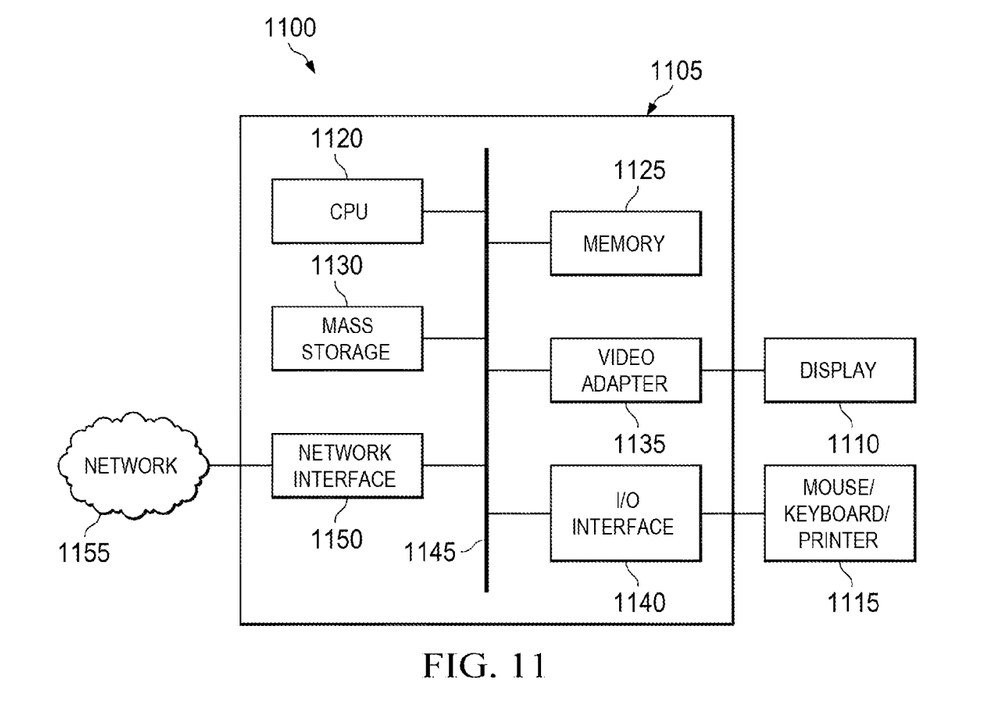
FIG. 11 is a block diagram of a processing system that may be used for implementing the devices and methods disclosed herein.

FIG. 11 is a block diagram of a processing system 1100 that may be used for implementing the devices and methods disclosed herein. In some embodiments, the processing system 1100 comprises a UE. In other embodiments, the processing system 1100 comprises a network controller. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1100 may comprise a processing unit 1105 equipped with one or more input/output devices, such as a human interface 1115 (including speaker, microphone, mouse, touchscreen, keypad, keyboard, printer, and the like), display 1110, and so on. The processing unit may include a central processing unit (CPU) 1120, memory 1125, a mass storage device 1130, a video adapter 1135, and an I/O interface 1140 connected to a bus 1145.

The bus 1145 may be one or more of any type of several bus architectures including a memory bus or memory controller, a peripheral bus, video bus, or the like. The CPU 1120 may comprise any type of electronic data processor. The memory 1125 may comprise any type of system memory such as static random access memory (SRAM), dynamic random access memory (DRAM), synchronous DRAM (SDRAM), read-only memory (ROM), a combination thereof, or the like. In an embodiment, the memory 1125 may include ROM for use at boot-up, and DRAM for program and data storage for use while executing programs.

The mass storage device 1130 may comprise any type of storage device configured to store data, programs, and other information and to make the data, programs, and other information accessible via the bus 1145. The mass storage device 1130 may comprise, for example, one or more of a solid state drive, hard disk drive, a magnetic disk drive, an optical disk drive, or the like.

The video adapter 1135 and the I/O interface 1140 provide interfaces to couple external input and output devices to the processing unit 1105. As illustrated, examples of input and output devices include the display 1110 coupled to the video adapter 1135 and the mouse/keyboard/printer 1115 coupled to the I/O interface 1140. Other devices may be coupled to the processing unit 1105, and additional or fewer interface devices may be utilized. For example, a serial interface such as Universal Serial Bus (USB) (not shown) may be used to provide an interface for a printer.

The processing unit 1105 also includes one or more network interfaces 1150, which may comprise wired links, such as an Ethernet cable or the like, and/or wireless links to access nodes or different networks 1155. The network interface 1150 allows the processing unit 1105 to communicate with remote units via the networks 1155. For example, the network interface 1150 may provide wireless communication via one or more transmitters/transmit antennas and one or more receivers/receive antennas. In an embodiment, the processing unit 1105 is coupled to a local-area network or a wide-area network 1155 for data processing and communications with remote devices, such as other processing units, the Internet, remote storage facilities, or the like.

Figure 12:
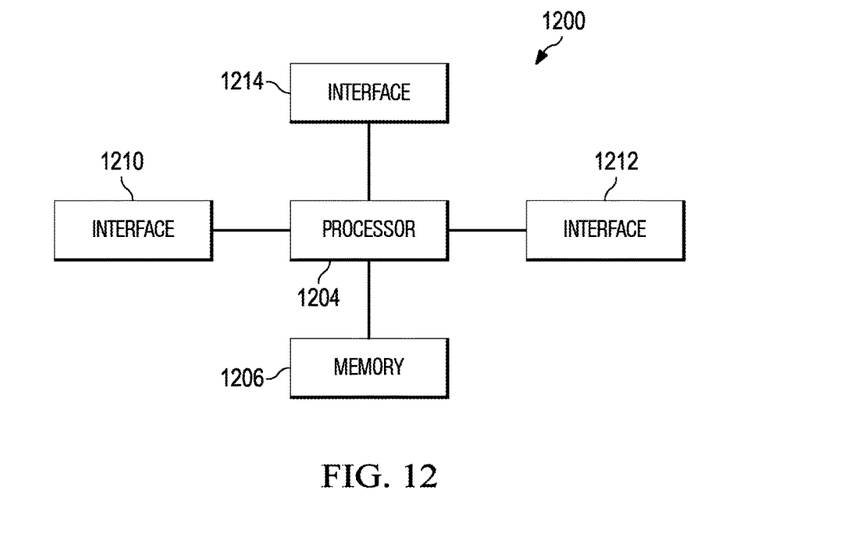
FIG. 12 illustrates a block diagram of an embodiment processing system 1200 for performing methods described herein.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 600 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
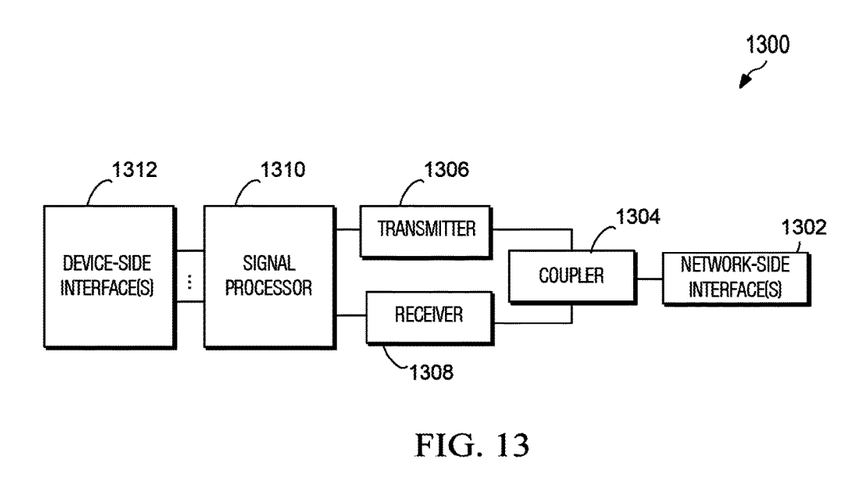
FIG. 13 illustrates a block diagram of a transceiver 1300 adapted to transmit and receive signaling over a telecommunications network according to example embodiments described herein.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for providing feedback information, the method comprising:
    receiving, by a user equipment (UE), a configuration of a plurality of offset values;
    measuring, by the UE, channel quality to generate measurements made by the UE;
    determining, by the UE, the feedback information in accordance with the measurements made by the UE and with the plurality of offset values; and
    sending, by the UE, the feedback information to a network controller.

2. The method of claim 1, wherein the determining is performed when the UE is not an interference risk UE.

3. The method of claim 2, further comprising determining the feedback information in accordance with the measurements made by the UE when the UE is an interference risk UE.

4. The method of claim 1, wherein the measurements specify throughput of the UE, and wherein the plurality of offset values specifies an interference caused to other UEs.

5. The method of claim 4, wherein the interference caused to the other UEs is determined by information exchanges, simulation, or approximation.

6. The method of claim 4, wherein the feedback information is based on the throughput of the UE and the interference caused to the other UEs.

7. The method of claim 4, wherein the feedback information comprises a summation or a weighted summation of the throughput of the UE and the interference caused to the other UEs.

8. The method of claim 4, wherein the feedback information comprises a summation of the throughput of the UE and the interference caused to the other UEs resulting in largest feedback information value.

9. The method of claim 1, further comprising receiving a signaling that configures a reporting of the feedback information.

10. The method of claim 1, wherein the feedback information comprises channel state information (CSI).

11. The method of claim 10, wherein the CSI comprises a rank indicator (RI) and a precoding matrix indicator (PMI) pair.

12. The method of claim 11, wherein the feedback information further comprises beam selection information, or a reference signal resource selection.

13. The method of claim 1, wherein the UE and the network controller are part of a communications system supporting three dimensional multiple input multiple output (3D MIMO) operation.

14. The method of claim 1, wherein the offset values include measured interference impact values or artificially-generated interference impact values.

15. The method of claim 1, wherein the UE considers one or both of self-optimization or network optimization in determining the feedback information.

16. A method for receiving feedback information, the method comprising:
    signaling, by a network controller, a configuration of a plurality of offset values, the configuration prompting a selection of the feedback information in accordance with measurements made by a user equipment (UE) and with the plurality of offset values; and
    receiving, by the network controller, the feedback information.

17. The method of claim 16, further comprising the network controller adjusting the received feedback information.

18. The method of claim 17, wherein the configuration is signaled in a radio resource control (RRC) signaling or a system information block (SIB).

19. A user equipment (UE) adapted to provide feedback information, the UE comprising:
    a processor; and
    a computer readable storage medium coupled to the processor and storing programming for execution by the processor, the programming including instructions that when executed by the processor configures the UE to:
        receive a configuration of a plurality of offset values,
        measure channel quality to generate measurements made by the UE,
        determine the feedback information in accordance with the measurements made by the UE and with the plurality of offset values, and
        send the feedback information to a network controller.

20. The UE of claim 19, wherein the feedback information is determined when the UE is not an interference risk UE.

21. The UE of claim 20, wherein the programming includes instructions to determine the feedback information in accordance with the measurements made by the UE when the UE is an interference risk UE.

22. The UE of claim 19, wherein the measurements specify throughput of the UE, and wherein the plurality of offset values specifies an interference caused to other UEs.

23. The UE of claim 22, wherein the feedback information is based on the throughput of the UE and the interference caused to the other UEs.

24. The UE of claim 19, wherein the programming includes instructions to receive a signaling that configures a reporting of the feedback information.

25. The UE of claim 19, wherein the feedback information comprises channel state information (CSI).

26. The UE of claim 25, wherein the CSI comprises a rank indicator (RI) and a precoding matrix indicator (PMI) pair.

27. The UE Of claim 26, wherein the feedback information further comprises beam selection information, or a reference signal resource selection.

28. The UE of claim 19, wherein the UE and the network controller are part of a communications system supporting three dimensional multiple input multiple output (3D MIMO) operation.

29. The UE of claim 19, wherein the offset values include measured interference impact values or artificially-generated interference impact values.

30. The UE of claim 19, wherein the UE considers one or both of self-optimization or network optimization in determining the feedback information.

\* \* \* \* \*